United States Patent
Holmer et al.

(10) Patent No.: US 12,088,643 B2
(45) Date of Patent: Sep. 10, 2024

(54) VIDEOCONFERENCING WITH REDUCED QUALITY INTERRUPTIONS UPON PARTICIPANT JOIN

(71) Applicant: Google LLC, Mountain View, CA (US)

(72) Inventors: Stefan Karl Holmer, Stockholm (SE); Danil Chapovalov, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/721,517

(22) Filed: Apr. 15, 2022

(65) Prior Publication Data

US 2023/0336594 A1 Oct. 19, 2023

(51) Int. Cl.
*H04L 65/80* (2022.01)
*H04L 65/1093* (2022.01)

(52) U.S. Cl.
CPC .......... *H04L 65/1093* (2013.01); *H04L 65/80* (2013.01)

(58) Field of Classification Search
CPC . H04L 65/1093; H04L 65/80; H04L 12/1831; H04N 7/15; H04N 21/234; H04M 3/567; H03M 7/6052; H04Q 2213/034
See application file for complete search history.

(56) References Cited

U.S. PATENT DOCUMENTS

| | | | | |
|---|---|---|---|---|
| 5,873,058 | A * | 2/1999 | Yajima | G10L 19/173 704/201 |
| 6,732,069 | B1 * | 5/2004 | Ekudden | G10L 19/083 704/219 |
| 9,113,132 | B2 * | 8/2015 | Lee | G11B 27/034 |
| 9,723,318 | B2 * | 8/2017 | Agthe | H04N 19/147 |
| 10,032,463 | B1 * | 7/2018 | Rastrow | G10L 15/183 |
| 2006/0088093 | A1 * | 4/2006 | Lakaniemi | H04L 1/0041 704/E19.044 |
| 2012/0236111 | A1 | 9/2012 | Halavy et al. | |

(Continued)

FOREIGN PATENT DOCUMENTS

| | | | | |
|---|---|---|---|---|
| WO | WO-0016315 A2 * | 3/2000 | | G10L 19/083 |
| WO | WO-2010075790 A1 * | 7/2010 | | H04M 3/568 |
| WO | WO-2020157287 A1 * | 8/2020 | | H04N 19/107 |

OTHER PUBLICATIONS

International Search Report and Written Opinion for Application No. PCT/US2023/018506, mailed Aug. 8, 2023, 15 pages.

*Primary Examiner* — Oanh Duong
(74) *Attorney, Agent, or Firm* — Dority & Manning, P.A.

(57) ABSTRACT

In an embodiment, a computing system can include one or more processors and one or more non-transitory computer-readable media that store instructions that, when executed by the one or more processors, cause the computing system to perform operations. The operations can include: receiving an internal encoder state of an encoder running on a first computing device being used to participate in a video conference currently in progress; receiving data indicative of a second computing device being used to join the video conference; compressing, based at least in part on receipt of the data, the internal encoder state to generate a compressed internal encoder state of the encoder; and/or transmitting the compressed internal encoder state to the second computing device to synchronize the internal encoder state of the encoder running on the first computing device with an internal decoder state of a decoder running on the second computing device.

18 Claims, 7 Drawing Sheets

(56) References Cited

U.S. PATENT DOCUMENTS

| | | | |
|---|---|---|---|
| 2014/0232817 A1* | 8/2014 | Jones | H04N 7/155 |
| | | | 379/85 |
| 2014/0281837 A1* | 9/2014 | Frigo | H03M 13/616 |
| | | | 714/776 |
| 2017/0201346 A1* | 7/2017 | Frigo | H03M 13/3972 |
| 2018/0167481 A1* | 6/2018 | Bhaskar | H04L 69/04 |
| 2018/0167631 A1 | 6/2018 | Schulze et al. | |
| 2019/0028741 A1 | 1/2019 | Davies | |

* cited by examiner

VIDEOCONFERENCING WITH REDUCED QUALITY INTERRUPTIONS UPON PARTICIPANT JOIN

FIELD

The present disclosure relates generally to multi-attendee video conference systems. More particularly, the present disclosure relates to lossless transfer of an internal codec state in a video conferencing system to facilitate reduced interruptions in quality due to joining of additional participant(s).

BACKGROUND

Video conference technologies, sometimes alternatively referred to as video teleconference or videotelephony, include technologies for the reception and transmission of audio and/or visual signals by users in different locations, for communication between people in real time.

In certain existing video conference systems, when a joining computing device joins a video conference that is in progress, a "key frame" is generated by the video encoder running on each participating computing device that is already participating in the video conference at the time the joining computing device joins. Each participating computing device then sends its key frame to the joining computing device to synchronize the video decoder running on the joining computing device with each video encoder running on each participating computing device.

A problem with using a key frame to synchronize the internal encoder state with the internal decoder state is that key frames involve relatively high computational costs (e.g., relatively high bandwidth costs). Another problem with key frames is that they cause a period of lower video quality and/or delay that is visible to and/or experienced by all participants of the video conference, including the newly joined participant (i.e., all the participating computing devices and the joining computing device). Consequently, the use of key frames scales poorly and generates a degradation in quality (e.g., visual resolution) among participants each time a new participant joins the conference.

SUMMARY

Aspects and advantages of embodiments of the present disclosure will be set forth in part in the following description, or can be learned from the description, or can be learned through practice of the embodiments.

According to one example embodiment, a computer-implemented method of transferring an internal codec state in a video conference system can include maintaining, by a first computing device operatively coupled to one or more processors, an internal encoder state of an encoder running on the first computing device. The first computing device being used to participate in a video conference currently in progress. The computer-implemented method can further include receiving, by the first computing device, data indicative of a second computing device being used to join the video conference. The computer-implemented method can further include compressing, by the first computing device, based at least in part on receipt of the data, the internal encoder state to generate a compressed internal encoder state of the encoder. The computer-implemented method can further include transmitting, by the first computing device, the compressed internal encoder state to the second computing device to synchronize the internal encoder state of the encoder running on the first computing device with an internal decoder state of a decoder running on the second computing device.

According to another example embodiment, a computer-implemented method of transferring an internal codec state in a video conference system can include receiving, by a first computing device operatively coupled to one or more processors, an internal encoder state of an encoder running on a second computing device being used to participate in a video conference currently in progress. The computer-implemented method can further include receiving, by the first computing device, data indicative of a third computing device being used to join the video conference. The computer-implemented method can further include compressing, by the first computing device, based at least in part on receipt of the data, the internal encoder state to generate a compressed internal encoder state of the encoder. The computer-implemented method can further include transmitting, by the first computing device, the compressed internal encoder state to the third computing device to synchronize the internal encoder state of the encoder running on the second computing device with an internal decoder state of a decoder running on the third computing device.

According to another example embodiment, a computing system can include one or more processors. The computing system can further include one or more non-transitory computer-readable media that store instructions that, when executed by the one or more processors, cause the computing system to perform operations. The operations can include receiving an internal encoder state of an encoder running on a first computing device being used to participate in a video conference currently in progress. The operations can further include receiving data indicative of a second computing device being used to join the video conference. The operations can further include compressing, based at least in part on receipt of the data, the internal encoder state to generate a compressed internal encoder state of the encoder. The operations can further include transmitting the compressed internal encoder state to the second computing device to synchronize the internal encoder state of the encoder running on the first computing device with an internal decoder state of a decoder running on the second computing device.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
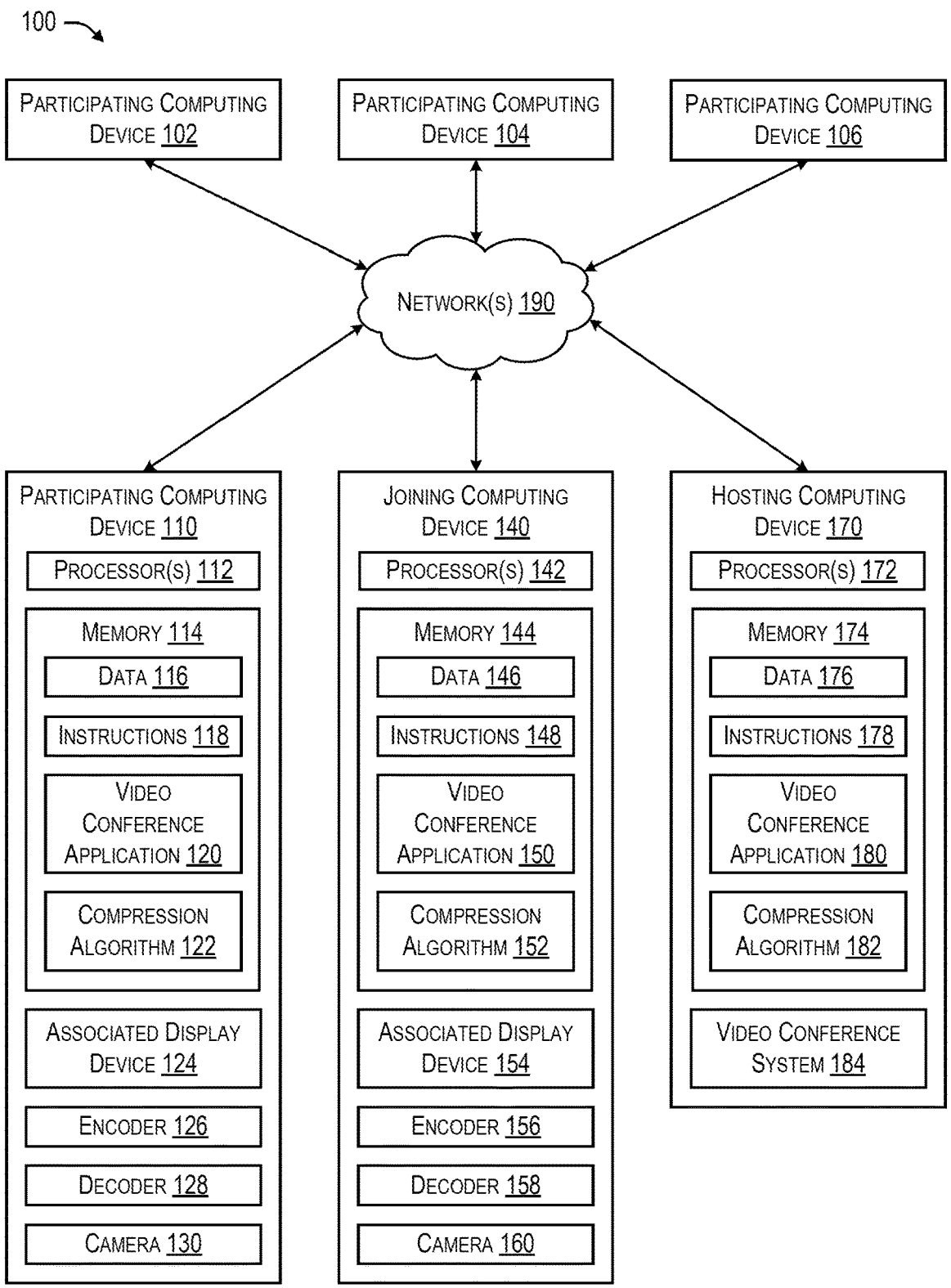
FIG. 1 illustrates a block diagram of an example, non-limiting video conference environment according to one or more example embodiments of the present disclosure.

Repeated use of reference characters and/or numerals in the present specification and/or figures is intended to represent the same or analogous features, elements, or operations of the present disclosure. Repeated description of reference characters and/or numerals that are repeated in the present specification is omitted for brevity.

DETAILED DESCRIPTION

Overview

As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

Example aspects of the present disclosure are directed to: the lossless compression of an internal encoder state of a video encoder running on a computing device being used to participate in a video conference (hereinafter, "participating computing device"); and the transfer of the compressed internal encoder state to a computing device being used to join the video conference (hereinafter, "joining computing device") to synchronize an internal decoder state of a video decoder running on the joining computing device with the internal encoder state of the video encoder running on the participating computing device. In example embodiments of the present disclosure, the internal encoder state of each video encoder running on each participating computing device in a video conference can be compressed using, for instance, a lossless compression process and sent to a joining computing device to synchronize an internal decoder state of a video decoder running on the joining computing device with the internal encoder state of each video encoder running on each participating computing device.

In certain existing video conference systems, when a joining computing device joins a video conference that is in progress, a "key frame" is generated by the video encoder running on each participating computing device that is already participating in the video conference at the time the joining computing device joins. Each participating computing device then sends its key frame to the joining computing device to synchronize the video decoder running on the joining computing device with each video encoder running on each participating computing device. Ensuring such synchronization occurs is critical for video coding since every subsequent video frame depends on the internal decoder state of the video decoder being the same as the internal encoder state of the video encoder when the video frame is generated and/or compressed.

A problem with using a key frame to synchronize the internal encoder state with the internal decoder state is that key frames involve relatively high computational costs (e.g., relatively high bandwidth costs). Another problem with key frames is that they cause a period of lower video quality and/or delay that is visible to and/or experienced by all participants of the video conference, including the newly joined participant (i.e., all the participating computing devices and the joining computing device). Consequently, the use of key frames scales poorly. Alternatively, some existing video conference systems use a "cyclic intra coding" process to spread the key frame out over multiple frames (e.g., by providing a portion of the key frame with a current frame (e.g., a current "delta" frame) over multiple current frames (e.g., over multiple current delta frames) until all portions of the key frame have been provided). As referenced herein, a "delta" frame can describe one or more portions of a video frame and/or statistical data corresponding thereto that is different from and/or more current (e.g., newer) compared to that included in an existing and/or current internal encoder and/or decoder state. A problem with the above-described cyclic intra coding process is that it primarily only reduces the delay in video involved with the above-described key frame process.

According to one or more example embodiments of the present disclosure, a computing device such as, for instance, a client computing device, a computer, a laptop, a smartphone, a tablet, a wearable computing device and/or another computing device described herein can facilitate lossless compression and transfer of an internal codec state (e.g., an internal encoder state, internal decoder state) in a video conference system. For example, in these one or more embodiments, the computing device can constitute a participating computing device that is being used to participate in a video conference that is in progress when a different computing device that can constitute a joining computing device is used to join the video conference. In these one or more embodiments, when the joining computing device joins the video conference, the participating computing device can perform a lossless compression process to compress an internal encoder state (e.g., an existing and/or most current internal encoder state) of a video encoder running on the participating computing device and transfer of the compressed internal encoder state to the joining computing device to synchronize an internal decoder state of a video decoder running on the joining computing device with the internal encoder state of the video encoder running on the participating computing device.

In at least one embodiment of the present disclosure, to facilitate such lossless compression and transfer of the internal encoder state of the video encoder, the participating computing device can perform operations that can include, but are not limited to: maintaining the internal encoder state of the video encoder running on the participating computing device; receiving data indicative of the joining computing device being used to join the video conference; compressing, based at least in part on (e.g., in response to) receipt of the data, the internal encoder state (e.g., the existing and/or most current internal encoder state) to generate a compressed internal encoder state of the video encoder; and transmitting the compressed internal encoder state to the joining computing device to synchronize the internal encoder state of the video encoder running on the participating computing device with an internal decoder state of a video decoder running on the joining computing device.

In accordance with one or more other embodiments described herein, a computing device such as for instance, a server, a host server, a backend server, and/or another computing device described herein can facilitate lossless compression and transfer of an internal codec state (e.g., an internal encoder state, internal decoder state) in a video conference system. For example, in these one or more embodiments, the computing device can constitute a computing device that is being used to implement and/or conduct a video conference (hereinafter, "hosting computing device") that is in progress and includes at least one participating computing device when a joining computing device is used to join the video conference. In these one or more embodiments, when the joining computing device joins the video conference, the hosting computing device can perform a lossless compression process to compress an internal encoder state of a video encoder (e.g., an existing and/or most current internal encoder state) running on the participating computing device and transfer of the compressed internal encoder state to the joining computing device to synchronize an internal decoder state of a video decoder running on the joining computing device with the internal encoder state of the video encoder running on the participating computing device.

In at least one embodiment of the present disclosure, to facilitate such lossless compression and transfer of the internal encoder state, the hosting computing device can perform operations that can include, but are not limited to: receiving the internal encoder state (e.g., the existing and/or most current internal encoder state) of a video encoder running on the participating computing device; receiving data indicative of the joining computing device being used to join the video conference (e.g., the hosting computing device can receive a request from the joining computing device to join the video conference); compressing, based at least in part on (e.g., in response to) receipt of the data, the internal encoder state to generate a compressed internal encoder state of the video encoder; and transmitting the compressed internal encoder state to the joining computing device to synchronize the internal encoder state of the video encoder running on the participating computing device with an internal decoder state of a video decoder running on the joining computing device.

In some embodiments of the present disclosure, a computing system can include the above-described computing device(s). For example, a computing system according to example embodiments described herein can constitute a video conference system that can include the above-described hosting computing device (e.g., a server, host server), participating computing device (e.g., a first client computing device, computer, laptop, smartphone, tablet, wearable computing device), and/or joining computing device (e.g., a second client computing device, computer, laptop, smartphone, tablet, wearable computing device).

To perform the operations described above and/or other operations described herein in accordance with one or more embodiments, each of the above-described computing devices and/or the computing system can include, be coupled to (e.g., communicatively, operatively), and/or otherwise be associated with one or more processors and/or one or more non-transitory computer-readable storage media. In these or other embodiments, the one or more non-transitory computer-readable storage media can store instructions that, when executed by the one or more processors, can cause each of the computing devices and/or the computing system (e.g., via the one or more processors) to perform the operations described above and/or other operations described herein to facilitate lossless compression and transfer of the internal codec state (e.g., the internal encoder state, the internal decoder state).

According to one or more embodiments of the present disclosure, the internal encoder state and/or internal decoder state can each constitute a memory (e.g., a random-access memory (RAM)) of the encoder and/or decoder, respectively. In some embodiments, the internal encoder state and/or internal decoder state can each include one or more portions of one or more reference frames (e.g., previously processed frames, also referred to as "frame buffers" or "reference buffers") of video data (e.g., a video, video stream, byte stream) associated with the video conference. For example, the internal encoder state and/or internal decoder state can each include static portion(s) and/or other portion(s) of previously processed frame(s) of video captured by one or more computing devices in the video conference. In additional or alternative embodiments, the internal encoder state and/or internal decoder state can each include statistical data (e.g., pixel data, histogram data) corresponding to the above-described one or more portions of the one or more reference frames and/or the one or more reference frames themselves. As such, in at least one embodiment, the compressed internal encoder state can include: one or more compressed portions of the one or more reference frames of the video data associated with the video conference; and/or compressed statistical data corresponding to the one or more compressed portions of the one or more reference frames and/or the one or more reference frames themselves.

In one or more embodiments described herein, based at least in part on (e.g., in response to) receiving data indicating that the joining computing device wants to join (e.g., a request to join), is joining, and/or has joined the video conference, the participating computing device and/or the hosting computing device can compress the internal encoder state of the video encoder to generate the compressed internal encoder state of the video encoder by using a compression algorithm having a lossless compression mode and/or a near lossless compression mode. For example, in these one or more embodiments, based at least in part on (e.g., in response to) receiving such data about the joining computing device joining the video conference, the participating computing device and/or the hosting computing device can compress the internal encoder state of the video encoder using such a compression algorithm set in the lossless compression mode or the near lossless compression mode such that compression of the internal encoder state constitutes and/or yields a lossless compression or a near lossless compression, respectively, of the internal encoder state.

Although example embodiments described herein are directed to lossless or near lossless compression of an internal encoder state of a video encoder(s) running on a participating computing device(s), the present disclosure is not so limiting. For example, in one embodiment, the participating computing device and/or the hosting computing device can use a compression algorithm having a lossy compression mode. In this embodiment, based at least in part on (e.g., in response to) receiving the data about the joining computing device joining the video conference, the participating computing device and/or the hosting computing device can compress the internal encoder state of the video encoder using such a compression algorithm set in the lossy compression mode such that compression of the internal encoder state constitutes and/or yields a lossy compression of the internal encoder state.

In the above-described embodiment, using a lossy compressed internal encoder state to synchronize (e.g., via the joining computing device) the internal decoder state of the video decoder running on the joining computing device with the internal encoder state of the video encoder running on the participating computing device would result in a partial or incomplete synchronization of the internal decoder state with the internal encoder state. In this embodiment, such partial or incomplete synchronization of the internal decoder state with the internal encoder state could cause errors that result in degradation of the video data (e.g., degradation of the video stream of the video conference). However, in some embodiments, combining (e.g., via the participating computing device, the hosting computing device, and/or the joining computing device) such use of a lossy compressed internal encoder state with one or more other processes such as, for example, a periodic intra refresh process could negate (e.g., eliminate) such errors over time such that the internal encoder state and the internal decoder state could converge into a synchronized state.

In at least one embodiment of the present disclosure, the participating computing device and/or the hosting computing device can transmit a current delta frame of video data associated with the video conference to the joining computing device. For example, in this or another embodiment, the participating computing device and/or the hosting computing device can send the joining computing device the current delta frame of the video of the video conference at a time the joining computing device is used to join the video conference (e.g., at the time the joining computing device requests entry into the video conference and/or at the time the joining computing device joins the video conference).

In one or more embodiments, the participating computing device and/or the hosting computing device can send the current delta frame of the video data (e.g., the current delta frame of the video of the video conference) to the joining computing device along with the compressed internal encoder state of the video encoder running on the participating computing device. In these one or more embodiments, the participating computing device and/or the hosting computing device can also transmit an instruction to the joining computing device instructing the joining computing device to use the compressed internal encoder state and/or the current delta frame of the video data to update the internal decoder state of the video decoder running on the joining computing device to synchronize the internal encoder state of the video encoder with the internal decoder state of the video decoder.

In at least one embodiment described herein, the participating computing device and/or the hosting computing device can instruct the joining computing device to store the compressed internal encoder state and/or the current delta frame of the video data in the memory (e.g., RAM) of the video decoder running on the joining computing device such that the compressed internal encoder state and/or the current delta frame constitute and/or serve as the internal decoder state of the video decoder. In this or another embodiment, once the joining computing device has stored the compressed internal encoder state and/or the current delta frame in the memory of the video decoder such that the compressed internal encoder state and/or the current delta frame constitute and/or serve as the internal decoder state of the video decoder, the internal encoder state of the video encoder running on the participating computing device will be synchronized with the internal decoder state of the video decoder running on the joining computing device.

In at least one embodiment of the present disclosure, the participating computing device and/or the hosting computing device can generate one or more delta frames that can include one or more video data updates associated with the internal encoder state and/or the compressed internal encoder state. For example, in this or another embodiment, the participating computing device and/or the hosting computing device can generate delta frame(s) having video data (e.g., portion(s) of video frames and/or statistical data corresponding thereto) that is different from and/or more current (e.g., newer) compared to the video data included in the compressed internal encoder state. In some embodiments, the participating computing device can maintain the internal encoder state of the video encoder running on the participating computing device by using such delta frame(s) and/or the video data thereof to update an existing (e.g., current) internal encoder state of the video encoder. For example, in these or other embodiments, when such delta frame(s) are generated by the participating computing device and/or provided to the participating computing device by, for instance, the hosting computing device and/or another computing device participating in the video conference, the participating computing device can replace an existing (e.g., current) internal encoder state of the video encoder with the delta frame(s) and/or the video data thereof.

In some embodiments, the participating computing device and/or the hosting computing device can transmit the above-described delta frame(s) to the joining computing device based at least in part on (e.g., in response to) synchronization of the internal encoder state of the video encoder with the internal decoder state of the video decoder. For instance, in these or other embodiments, after synchronization of the internal encoder state of the video encoder with the internal decoder state of the video decoder as described above, the participating computing device and/or the hosting computing device can transmit such delta frame(s) to the joining computing device along with an instruction that instructs the joining computing device to use the delta frame(s) to update the internal decoder state of the video decoder such that the delta frame(s) and/or the video data thereof constitute and/or serve as the internal decoder state of the video decoder. For example, in these or other embodiments, the participating computing device and/or the hosting computing device can transmit such delta frame(s) to the joining computing device along with an instruction that instructs the joining computing device to replace the compressed internal encoder state stored in the memory of the video decoder with the delta frame(s) such that the delta frame(s) and/or the video data thereof constitute and/or serve as the internal decoder state of the video decoder. In these or other embodiments, once the joining computing device has used the delta frame(s) to update the internal decoder state (e.g., the memory) of the video decoder such that the delta frame(s) and/or the video data thereof constitute and/or serve as the internal decoder state of the video decoder, the internal encoder state of the video encoder running on the participating computing device will once again be synchronized with the internal decoder state of the video decoder running on the joining computing device.

In some embodiments, the participating computing device and/or the hosting computing device can implement the above-described lossless or near lossless compression process to compress one or more portions of the internal encoder state. For example, in these embodiments, the participating computing device and/or the hosting computing device can compress a certain percentage (%) of internal frame reference buffers (e.g., internal reference frames) of the internal encoder state. For instance, in some embodiments, the participating computing device and/or the hosting computing device can compress 1 out of 4 internal frame reference buffers (e.g., 1 out of every 4, 25%), as well as one or more probability contexts (e.g., statistical data corresponding to such 1 out of every 4 internal frame reference buffers) and/or other state data which can be relatively smaller in size compared to the internal frame reference buffers. In some embodiments, the percentage of internal frame reference buffers that can be compressed by the participating computing device and/or the hosting computing device can vary depending on the codec system(s)

running on the participating computing device, the hosting computing device, and/or the joining computing device (e.g., the percentage can vary depending on the type(s) of code system(s) running on such device(s)).

In the above embodiments, based at least in part on (e.g., in response to) compression of such portion(s) of the internal encoder state (e.g., compression of 1 out of every 4 internal frame reference buffers), the participating computing device and/or the hosting computing device can transmit the compressed portion(s) of the internal encoder state to the joining computing device to synchronize (e.g., by the joining computing device) the internal decoder state of the video decoder running on the joining computing device with the internal encoder state running on the participating computing device. In these embodiments, based on synchronization (e.g., by the joining computing device) of the internal decoder state with the internal encoder state using such compressed portion(s) of the internal encoder state, the participating computing device and/or the hosting computing device can send the joining computing device a following delta frame as described above (e.g., a subsequent delta frame). In these embodiments, such a delta frame can be used to predict (e.g., via the video encoder, video decoder) from only the frame buffer that has been synchronized (e.g., the 1 out of the 4 described above) and can further be used to update (e.g., via the video encoder, video decoder) all the remaining internal frame reference buffers (e.g., the other 3 out of the 4 described above) with the result of the decoded delta frame. In these embodiments, upon completion of such an operation, all 4 internal frame reference buffers will be synchronized. It should be appreciated that the above-described synchronization process using compressed portion(s) of the internal encoder state can be computationally less expensive than transferring the full state, while achieving approximately the same result.

In one or more embodiments where the hosting computing device is conducting (e.g., implementing, hosting) the video conference, the hosting computing device can receive data indicative of the joining computing device being used to join the video conference (e.g., the hosting computing device can receive a request from the joining computing device to join the video conference). In these one or more embodiments, based at least in part on (e.g., in response to) receiving such data, the hosting computing device can receive multiple internal encoder states of a plurality of video encoders respectively running on multiple participating computing devices being used to participate in the video conference at the time the joining computing device is used to join the video conference. In these one or more embodiments, the hosting computing device can compress the multiple internal encoder states to generate a plurality of compressed internal encoder states respectively corresponding to the plurality of video encoders. In these one or more embodiments, the hosting computing device can further transmit the plurality of compressed internal encoder states and/or current delta frames of the multiple participating computing devices to the joining computing device to synchronize (e.g., as described above) the multiple internal encoder states of the plurality of video encoders respectively running on the multiple participating computing devices with the internal decoder state of the video decoder running on the joining computing device.

In one embodiment where the hosting computing device is conducting (e.g., implementing, hosting) the video conference, the hosting computing device can instruct the joining computing device to store the plurality of compressed internal encoder states and/or the current delta frames of the multiple participating computing devices in the memory (e.g., RAM) of the video decoder running on the joining computing device such that the plurality of compressed internal encoder states and/or the current delta frames constitute and/or serve as the internal decoder state of the video decoder. In this or another embodiment, once the joining computing device has stored the plurality of compressed internal encoder states and/or the current delta frames of the multiple participating computing devices in the memory of the video decoder such that the plurality of compressed internal encoder states and/or the current delta frames constitute and/or serve as the internal decoder state of the video decoder, the multiple internal encoder states of the plurality of video encoders respectively running on the multiple participating computing devices will be synchronized with the internal decoder state of the video decoder running on the joining computing device. In this or another embodiment, based at least in part on (e.g., in response to) such synchronization of the multiple internal encoder states with the internal decoder state, the hosting computing device can generate the above-described delta frame(s) for each of the multiple participating computing devices (e.g., for each video encoder respectively running on the multiple participating computing devices and/or with respect to each internal encoder state of each video encoder).

In at least one embodiment where the hosting computing device is conducting (e.g., implementing, hosting) the video conference, the hosting computing device can transmit (e.g., periodically during the video conference) such delta frame(s) to the joining computing device along with an instruction that instructs the joining computing device to use the delta frame(s) to update (e.g., as described above) the internal decoder state of the video decoder such that the delta frame(s) and/or the video data thereof constitute and/or serve as the internal decoder state of the video decoder. In this or another embodiment, once the joining computing device has used such delta frame(s) to update the internal decoder state (e.g., the memory) of the video decoder such that the delta frame(s) and/or the video data thereof constitute and/or serve as the internal decoder state of the video decoder, the multiple internal encoder states of the plurality of video encoders respectively running on the multiple participating computing devices will once again be synchronized with the internal decoder state of the video decoder running on the joining computing device.

In one or more embodiments of the present disclosure, the participating computing device, the joining computing device, and the hosting computing device can communicate and/or transfer data with one another using a network such as, for example, a local area network (LAN), a wireless and/or wired network, a wide area network (WAN), and/or another network. In one embodiment, the participating computing device can transmit the above-described internal encoder state of the video encoder running on the participating computing device to the hosting computing device by using such a network described above (e.g., LAN, WAN, wireless, wired). In another embodiment, the participating computing device and/or the hosting computing device can transmit the above-described compressed internal encoder state, current delta frame of video data, instruction, and/or delta frame(s) to the joining computing device by using such a network described above (e.g., LAN, WAN, wireless, wired).

Example aspects of the present disclosure provide several technical effects, benefits, and/or improvements in computing technology. For instance, in example embodiments, when a joining computing device joins a video conference that is in progress, the existing and/or most current internal encoder state of a video encoder running on each participating computing device can be compressed and transmitted only to the joining computing device to synchronize a video decoder running on the joining computing device with the video encoder running on each participating computing device. In these or other embodiments, video decoders running on the participating computing device(s) being used to participate in the video conference when the joining computing device joins would already have the existing and/or most current internal encoder states of the video encoders running on the participating computing device(s), as such existing and/or most current internal encoder states would have been used to synchronize the internal states of all such video encoders and video decoders before the joining computing device joins the video conference.

Therefore, the disclosed technology according to example embodiments described herein can eliminate the operation of providing video data updates in the form of a key frame to the participating computing device(s) already participating in the video conference at the time the joining computing device joins. Instead, the disclosed technology according to example embodiments described herein can facilitate lossless or near lossless compression of the existing and/or most current internal encoder state of the video encoder running on each participating computing device and transmit the compressed internal encoder state only to the joining computing device to synchronize only the video decoder running on the joining computing device with the video encoder running on each participating computing device.

Accordingly, by eliminating the operation of providing video data updates in the form of a key frame to all participating computing device(s) already participating in the video conference when a joining computing device joins, the disclosed technology according to example embodiments described herein can thereby eliminate computational and/or bandwidth costs, as well as reduce latency (e.g., delayed video and/or audio) associated with providing the key frame to all such participating computing device(s) each time a joining computing device joins the video conference. Additionally, or alternatively, by facilitating lossless or near lossless compression of the existing and/or most current internal encoder state of the video encoder running on each participating computing device and transmitting the compressed internal encoder state only to the joining computing device, the disclosed technology according to example embodiments described herein can thereby reduce computational and/or bandwidth costs, as well as reduce latency (e.g., delayed video and/or audio) associated with providing the compressed internal encoder state to the joining computing device while maintaining the quality of the video data (e.g., without loss of video data quality).

Example Devices and Systems

FIG. 1 illustrates a block diagram of an example, non-limiting video conference environment 100 according to one or more example embodiments of the present disclosure. As illustrated in the example embodiment depicted in FIG. 1, video conference environment 100 can include one or more participating computing devices 102, 104, 106, 110, a joining computing device 140, and a hosting computing device 170 that can be coupled (e.g., communicatively, operatively) to one another through one or more networks 190. Although four participating computing devices 102, 104, 106, 110 and one joining computing device 140 are depicted in the example embodiment depicted in FIG. 1, any number of participating and/or joining computing devices can be included in video conference environment 100 and coupled (e.g., communicatively, operatively) to hosting computing device 170 over network(s) 190.

In one or more embodiments of the present disclosure, participating computing devices 102, 104, 106, 110 and/or joining computing device 140 can each be, for example, a computer, a smartphone, a tablet, a laptop, a desktop computer, a wearable computing device (e.g., smart glasses), and/or any other computing device that can be configured such that it can be used by a user to join and participate in a video conference. As illustrated in the example embodiment depicted in FIG. 1, participating computing device 110 can include one or more processors 112, memory 114, an associated display device 124, an encoder 126 (e.g., a video encoder), a decoder 128 (e.g., a video decoder), and/or a camera 130. In this or another embodiment, joining computing device 140 can include one or more processors 142, memory 144, an associated display device 154, an encoder 156 (e.g., a video encoder), a decoder 158 (e.g., a video decoder), and/or a camera 160.

In some embodiments, participating computing device 102, 104, and/or 106 can each be the same type of computing device and/or include the same components, structure, attributes, and/or functionality as that of participating computing device 110. In some embodiments, participating computing device 102, 104, and/or 106 can each be a different type of computing device and/or include components, structure, attributes, and/or functionality that are different from that of participating computing device 110. For purposes of clarity and brevity, participating computing device 102, 104, and/or 106 according to example embodiments described herein, can each include one or more processors 112, memory 114, an associated display device 124, an encoder 126 (e.g., a video encoder), a decoder 128 (e.g., a video decoder), and/or a camera 130.

In one or more embodiments of the present disclosure, hosting computing device 170 can be, for example, a computer, a server, a host server, and/or any other computing device that can be configured such that it can be used to implement and/or conduct a video conference. As illustrated in the example embodiment depicted in FIG. 1, hosting computing device 170 can include one or more processors 172, memory 174, and/or a video conference system 184.

As referenced herein, the term "system" can refer to hardware (e.g., application specific hardware), computer logic that executes on a general-purpose processor (e.g., a central processing unit (CPU)), and/or some combination thereof. In some embodiments, a "system" (e.g., video conference system 184) can be implemented in hardware, application specific circuits, firmware, and/or software controlling a general-purpose processor. In some embodiments, a "system" (e.g., video conference system 184) can be implemented as program code files stored on a storage device (e.g., memory 174), loaded into memory and executed by a processor (e.g., processor(s) 172), and/or can be provided from computer program products, for example, computer-executable instructions that are stored in a tangible computer-readable storage medium (e.g., memory 174, random-access memory (RAM), hard disk, optical media, magnetic media).

Processor(s) 112, processor(s) 142, and/or processor(s) 172, according to example embodiments described herein can each be a processing device. For example, in the example embodiment depicted in FIG. 1, processor(s) 112, processor(s) 142, and/or processor(s) 172 can each be a central processing unit (CPU), microprocessor, microcontroller, integrated circuit (e.g., an application specific integrated circuit (ASIC)), and/or another type of processing device.

In some embodiments, processor(s) 142 and/or processor(s) 172 can each be the same type of processor and/or include the same components, structure, attributes, and/or functionality as that of processor(s) 112. In some embodiments, processor(s) 142 and/or processor(s) 172 can each be a different type of processor and/or include components, structure, attributes, and/or functionality that are different from that of processor(s) 112.

Memory 114, memory 144, and/or memory 174 according to example embodiments described herein can each store computer-readable and/or computer executable entities (e.g., data, information, applications, models, algorithms, etc.) that can be created, modified, accessed, read, retrieved, and/or executed by processor(s) 112, processor(s) 142, and/or processor(s) 172, respectively. In some embodiments, memory 114, memory 144, and/or memory 174 can each include a computing system and/or media such as, for example, one or more non-transitory computer-readable media, volatile memory, non-volatile memory, random-access memory (RAM), read only memory (ROM), hard drives, flash drives, and/or other memory devices.

In the example embodiment depicted in FIG. 1, memory 114 can include data 116 (e.g., structured data, unstructured data, application specific data), instructions 118, video conference application 120, and/or compression algorithm 122. In this embodiment, memory 144 can include data 146 (e.g., structured data, unstructured data, application specific data), instructions 148, video conference application 150, and/or compression algorithm 152. In this embodiment, memory 174 can include data 176 (e.g., structured data, unstructured data, application specific data), instructions 178, video conference application 180, and/or compression algorithm 182.

In some embodiments, memory 144 and/or memory 174 can each be the same type of memory and/or include the same components, structure, attributes, and/or functionality as that of memory 114. In some embodiments, memory 144 and/or memory 174 can each be a different type of memory and/or include components, structure, attributes, and/or functionality that are different from that of memory 114.

Data 116, data 146, and/or data 176 according to example embodiments described herein can each include, for instance, video conference data that can be retrieved, manipulated, created, and/or stored by processor(s) 112, processor(s) 142, and/or processor(s) 172, respectively. For instance, in one embodiment, data 116, data 146, and/or data 176 can each include video data (e.g., a video, video stream, byte stream), audio data, image data, and/or other data that can be captured (e.g., during a video conference) at any of participating computing devices 102, 104, 106, 110 (e.g., via camera 130) and/or joining computing device 140 (e.g., via camera 160).

In some embodiments, data 116 and/or data 146 can each be transmitted (e.g., during a video conference) to hosting computing device 170 by any of participating computing devices 102, 104, 106, 110 and/or joining computing device 140, respectively. In some embodiments, data 176 can be transmitted (e.g., during a video conference) by hosting computing device 170 to any of participating computing devices 102, 104, 106, 110 and/or joining computing device 140. In some embodiments, data 116, data 146, and/or data 176 can each be accessed by and/or displayed to (e.g., during a video conference) one or more users of participating computing devices 102, 104, 106, 110 and/or joining computing device 140.

In some embodiments, data 146 and/or data 176 can each be the same type of data as that of data 116 (e.g., reference frame(s) and/or delta frame(s) of video data captured during a video conference and/or statistical data corresponding to such frame(s)). In some embodiments, data 146 and/or data 176 can each be a different type of data than that of data 116 (e.g., different reference frame(s) and/or different delta frame(s) of video data captured during a video conference and/or different statistical data corresponding to such frame(s)).

Instructions 118, instructions 148, and/or instructions 178 according to example embodiments described herein can each include, for example, any computer-readable and/or computer executable instructions (e.g., software, routines, processing threads) that, when executed by processor(s) 112, processor(s) 142, and/or processor(s) 172, respectively, cause participating computing devices 102, 104, 106, 110, joining computing device 140, and/or hosting computing device 170, respectively, to perform one or more certain operations. For example, in some embodiments, instructions 118, instructions 148, and/or instructions 178 can each include instructions that, when executed by processor(s) 112, processor(s) 142, and/or processor(s) 172, respectively, can facilitate video conferencing between participating computing devices 102, 104, 106, 110, joining computing device 140, and/or hosting computing device 170.

In some embodiments, instructions 148 and/or instructions 178 can each be the same type of instructions as that of instructions 118 (e.g., instructions that can facilitate video conferencing between any of participating computing devices 102, 104, 106, 110, joining computing device 140, and/or hosting computing device 170). In some embodiments, instructions 148 and/or instructions 178 can each be a different type of instructions than instructions 118 (e.g., instructions specific to joining computing device 140 and/or hosting computing device 170, respectively, that can facilitate video conferencing between any of participating computing devices 102, 104, 106, 110, joining computing device 140, and/or hosting computing device 170).

Video conference application 120, video conference application 150, and/or video conference application 180 according to example embodiments described herein can each be implemented by any of participating computing devices 102, 104, 106, 110, joining computing device 140, and/or hosting computing device 170, respectively, to facilitate video conferencing between participating computing devices 102, 104, 106, 110, joining computing device 140, and/or hosting computing device 170. In some embodiments, video conference application 150 and/or video conference application 180 can each be the same type of video conference application and/or include the same components, structure, attributes, and/or functionality as that of video conference application 120. In some embodiments, video conference application 150 and/or video conference application 180 can each be a different type of video conference application and/or include components, structure, attributes, and/or functionality that are different from that of video conference application 120.

In the example embodiment depicted in FIG. 1, video conference application 120 can be respectively implemented (e.g., executed, run, initiated) by any of participating computing devices 102, 104, 106, 110 (e.g., via processor(s) 112) to capture video data, image data, and/or audio data using, for instance, camera 130, a microphone (not shown), and/or another data input device that can be respectively coupled to, included with, and/or otherwise associated with any of participating computing devices 102, 104, 106, 110. In this embodiment, video conference application 150 can be implemented (e.g., executed, run, initiated) by joining computing device 140 (e.g., via processor(s) 142) to capture video data, image data, and/or audio data using, for instance, camera 160, a microphone (not shown), and/or another data input device that can be coupled to, included with, and/or otherwise associated with joining computing device 140.

Associated display device 124 and/or associated display device 154 according to example embodiments described herein can be any type of display device that can be configured to display video data (e.g., a video stream) and/or image data and can be coupled to, included with, and/or otherwise associated with any of participating computing devices 102, 104, 106, 110 and/or joining computing device 140, respectively. For example, in at least one embodiment, associated display device 124 and/or associated display device 154 can each be a monitor, a screen, and/or a display device that can include, but is not limited to, a laptop display device, a smartphone display device, a communicatively connected display device, and/or another associated display device.

In some embodiments, associated display device 154 can be the same type of associated display device and/or include the same components, structure, attributes, and/or functionality as that of associated display device 124. In some embodiments, associated display device 154 can be a different type of associated display device and/or include components, structure, attributes, and/or functionality that are different from that of associated display device 124.

Encoder 126 and/or encoder 156 according to example embodiments described herein can each constitute and/or include, for instance, a video encoder (e.g., hardware and/or software video encoder) that can be configured to compress and/or encode video data (e.g., video stream, video frame(s), image data, statistical data corresponding to such video data). In some embodiments, encoder 156 can be the same type of encoder (e.g., same type of video encoder) and/or include the same components, structure, attributes, and/or functionality as that of encoder 126. In some embodiments, encoder 156 can be a different type of encoder (e.g., different type of video encoder) and/or include components, structure, attributes, and/or functionality that are different from that of encoder 126.

Decoder 128 and/or decoder 158 according to example embodiments described herein can each constitute and/or include, for instance, a video decoder (e.g., hardware and/or software video decoder) that can be configured to decompress and/or decode video data (e.g., video stream, video frame(s), image data, statistical data corresponding to such video data). In some embodiments, decoder 158 can be the same type of decoder (e.g., same type of video decoder) and/or include the same components, structure, attributes, and/or functionality as that of decoder 128. In some embodiments, decoder 158 can be a different type of decoder (e.g., different type of video decoder) and/or include components, structure, attributes, and/or functionality that are different from that of decoder 128.

Camera 130 and/or camera 160 according to example embodiments described herein can each be any device capable of capturing visual data (e.g., a digital camera, analog camera, an integrated webcam, communicatively connected camera device). In some embodiments, camera 160 can be the same type of camera (e.g., same type of video camera) and/or include the same components, structure, attributes, and/or functionality as that of camera 130. In some embodiments, camera 160 can be a different type of camera (e.g., different type of video camera) and/or include components, structure, attributes, and/or functionality that are different from that of camera 130.

Compression algorithm 122, compression algorithm 152, and/or compression algorithm 182 according to example embodiments described herein can each be a compression algorithm (e.g., data compression algorithm) that can be implemented to compress data such as, for example, video data (e.g., a video frame(s), image data, statistical data corresponding to such video data). In at least one embodiment, compression algorithm 122, compression algorithm 152, and/or compression algorithm 182 can each be a compression algorithm (e.g., a video and/or image compression algorithm) having a lossless compression mode and/or a near lossless compression mode. In this embodiment, compression algorithm 122, compression algorithm 152, and/or compression algorithm 182 can each be implemented in such a lossless compression mode or near lossless compression mode to provide lossless or near lossless compression of data such as, for instance, video data associated with a video conference between any of participating computing devices 102, 104, 106, 110, joining computing device 140, and/or hosting computing device 170.

In some embodiments, compression algorithm 152 and/or compression algorithm 182 can each be the same type of compression algorithm and/or include the same components, structure, attributes, and/or functionality as that of compression algorithm 122. In some embodiments, compression algorithm 152 and/or compression algorithm 182 can each be a different type of compression algorithm and/or include components, structure, attributes, and/or functionality that are different from that of compression algorithm 122.

Video conference system 184 according to example embodiments described herein can constitute and/or include a "system" as defined above that can be implemented by hosting computing device 170 (e.g., via processor(s) 172) to facilitate video conferencing between any of participating computing devices 102, 104, 106, 110, joining computing device 140, and/or hosting computing device 170. In the example embodiment depicted in FIG. 1, video conference system 184 can be implemented (e.g., executed, run, initiated) by hosting computing device 170 (e.g., via processor(s) 172) to implement and/or conduct a video conference between any of participating computing devices 102, 104, 106, 110, joining computing device 140, and/or hosting computing device 170. For example, in this embodiment, video conferencing system 184 can be configured to facilitate operation of video conference application 120, video conference application 150, and/or video conference application 180 that can be respectively executed by any of participating computing devices 102, 104, 106, 110, joining computing device 140, and/or hosting computing device 170.

In the example embodiment depicted in FIG. 1, video conference system 184 can receive video stream data from any of participating computing devices 102, 104, 106, 110 and/or joining computing device 140 (e.g., via network(s) 190) respectively associated with a plurality of video conference attendees. In this embodiment, video conference system 184 can provide the video stream data to any of participating computing devices 102, 104, 106, 110 and/or joining computing device 140.

In at least one embodiment, video conference system 184 can manage provided stream data quality. For example, in some embodiments, video conference system 184 can manage provided stream data quality by transmitting requests to any of participating computing devices 102, 104, 106, 110 and/or joining computing device 140 to provide video stream data with a certain quality and/or resolution. In these embodiments, hosting computing device 170 can utilize video conference system 184 to facilitate the functionality of video conference application 120 and/or video conference application 150 that can be executed on any of participating computing devices 102, 104, 106, 110 and/or joining computing device 140, respectively.

Network(s) 190 according to example embodiments described herein can be any type of communications network such as, for example, a local area network (e.g., intranet), wide area network (e.g., Internet), and/or some combination thereof. In some embodiments, communication between any of participating computing devices 102, 104, 106, 110, joining computing device 140, and/or hosting computing device 170 can be carried via network interface with network(s) 190 using any type of wired and/or wireless connection, using a variety of communication protocols, encodings or formats, and/or protection schemes. For example, in at least one embodiment, communication between such devices can be carried via network interface with network(s) 190 using: communication protocols such as, for instance, transmission control protocol/internet protocol (TCP/IP), hypertext transfer protocol (HTTP), simple mail transfer protocol (SMTP), file transfer protocol (FTP), user datagram protocol (UDP), real-time transport protocol (RTP), and/or real-time transport control protocol (RTCP); encodings or formats such as, for instance, hypertext markup language (HTML) and/or extensible markup language (XML); and/or protection schemes such as, for instance, virtual private network (VPN), secure HTTP, secure shell (SSH), secure sockets layer (SSL), and/or secure real-time transport protocol (SRTP).

Example Device and System Operation

Continuing with FIG. 1, according to example embodiments of the present disclosure, video conference environment 100 can facilitate lossless compression of an internal encoder state of a video encoder running on a first computing device being used to participate in a video conference. In these example embodiments, video conference environment 100 can further facilitate transfer of the compressed internal encoder state to a second computing device being used to join the video conference to synchronize an internal decoder state of a video decoder running on the second computing device with the internal encoder state of the video encoder running on the first computing device.

In one example embodiment, participating computing device 110 can be used to participate in a video conference (e.g., via video conference application 120) that is in progress when joining computing device 140 is used to join the video conference (e.g., via video conference application 150). In this embodiment, when joining computing device 140 joins the video conference, participating computing device 110 can: perform a lossless compression process (e.g., using compression algorithm 122 according to instructions 118) to compress an internal encoder state (e.g., an existing and/or most current internal encoder state) of encoder 126 running on participating computing device 110; and transfer (e.g., via network(s) 190 and/or video conference applications 120, 150) the compressed internal encoder state to joining computing device 140 to synchronize an internal decoder state of decoder 158 running on joining computing device 140 with the internal encoder state of encoder 126 running on participating computing device 110.

In another example embodiment, participating computing device 110 can be used to participate in a video conference (e.g., via video conference application 120) that is in progress when joining computing device 140 is used to join the video conference (e.g., via video conference application 150). In this embodiment, when joining computing device 140 joins the video conference, hosting computing device 170 can: perform a lossless compression process (e.g., using compression algorithm 182 according to instructions 178) to compress an internal encoder state (e.g., an existing and/or most current internal encoder state) of encoder 126 running on participating computing device 110; and transfer (e.g., via network(s) 190, video conference applications 150, 180, and/or video conference system 184) the compressed internal encoder state to joining computing device 140 to synchronize an internal decoder state of decoder 158 running on joining computing device 140 with the internal encoder state of encoder 126 running on participating computing device 110.

In another example embodiment, participating computing devices 102, 104, 106, 110 can be used to participate in a video conference (e.g., via video conference application 120 respectively running on each participating computing device) that is in progress when joining computing device 140 is used to join the video conference (e.g., via video conference application 150). In this embodiment, when joining computing device 140 joins the video conference, hosting computing device 170 can: perform a lossless compression process (e.g., using compression algorithm 182 according to instructions 178) to compress an internal encoder state (e.g., an existing and/or most current internal encoder state) of each video encoder respectively running on participating computing devices 102, 104, 106, 110 (e.g., each encoder 126 respectively running on participating computing devices 102, 104, 106, 110); and transfer (e.g., via network(s) 190, video conference applications 150, 180, and/or video conference system 184) each compressed internal encoder state to joining computing device 140 to synchronize an internal decoder state of decoder 158 running on joining computing device 140 with the internal encoder state of each video encoder respectively running on participating computing devices 102, 104, 106, 110 (e.g., the internal encoder state of each encoder 126 respectively running on participating computing devices 102, 104, 106, 110).

In another example embodiment, participating computing device 110 can be used to participate in a video conference (e.g., via video conference application 120) that is in progress when joining computing device 140 is used to join the video conference (e.g., via video conference application 150). In this embodiment, when joining computing device 140 joins the video conference, joining computing device 140 can: receive (e.g., via network(s) 190, video conference applications 120, 150, and/or 180, and/or video conference system 184) a compressed internal encoder state of encoder 126 running on participating computing device 110 (e.g., a compressed version of an existing and/or most current internal encoder state of encoder 126); and use the compressed internal encoder state to synchronize an internal decoder state of decoder 158 running on joining computing device 140 with the internal encoder state of encoder 126 running on participating computing device 110 (e.g., by storing the compressed internal encoder state in the memory (e.g., RAM) of decoder 158).

In another example embodiment, participating computing devices 102, 104, 106, 110 can be used to participate in a video conference (e.g., via video conference application 120 respectively running on each participating computing device) that is in progress when joining computing device 140 is used to join the video conference (e.g., via video conference application 150). In this embodiment, when joining computing device 140 joins the video conference, joining computing device 140 can: receive (e.g., via network(s) 190, video conference applications 120, 150, and/or 180, and/or video conference system 184) a compressed internal encoder state of each video encoder respectively running on participating computing devices 102, 104, 106, 110 (e.g., a compressed internal encoder state of each encoder 126 respectively running on participating computing devices 102, 104, 106, 110); and use the compressed internal encoder states to synchronize an internal decoder state of decoder 158 running on joining computing device 140 with the internal encoder state of each video encoder respectively running on participating computing devices 102, 104, 106, 110 (e.g., the internal encoder state of each encoder 126 respectively running on participating computing devices 102, 104, 106, 110).

Example Methods

Figure 2:
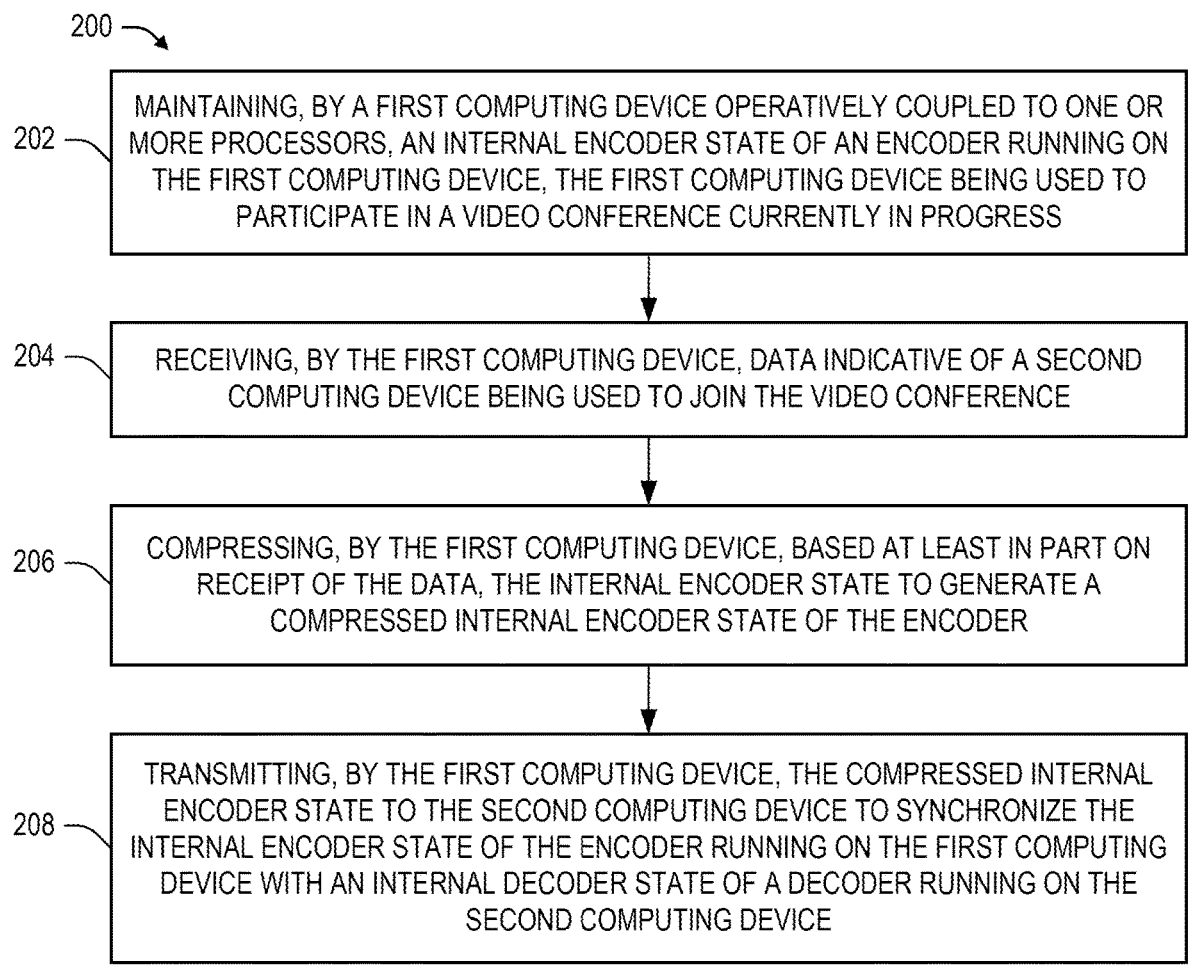
FIGS. 2-7 each illustrate a flow diagram of an example, non-limiting computer-implemented method according to one or more example embodiments of the present disclosure.

FIG. 2 illustrates a flow diagram of an example, non-limiting computer-implemented method 200 according to one or more example embodiments of the present disclosure. Computer-implemented method 200 can be implemented using, for instance, video conference environment 100, participating computing device 110, joining computing device 140, and/or hosting computing device 170 described above with reference to FIG. 1.

The example embodiment illustrated in FIG. 2 depicts operations performed in a particular order for purposes of illustration and discussion. Those of ordinary skill in the art, using the disclosures provided herein, will understand that various operations or steps of computer-implemented method 200 or any of the other methods disclosed herein may be adapted, modified, rearranged, performed simultaneously, include operations not illustrated, and/or modified in various ways without deviating from the scope of the present disclosure.

At 202, computer-implemented method 200 can include maintaining, by a first computing device (e.g., participating computing device 110) operatively coupled to one or more processors (e.g., processor(s) 112), an internal encoder state of an encoder (e.g., encoder 126) running on the first computing device, the first computing device being used to participate in a video conference currently in progress. For example, participating computing device 110 can periodically and/or continuously (e.g., as needed) update an existing and/or most current internal encoder state of encoder 126 using, for instance, delta frames having current video data associated with a video stream of the video conference that can be generated by and/or provided to (e.g., as needed) participating computing device 110 during the video conference.

At 204, computer-implemented method 200 can include receiving, by the first computing device, data indicative of a second computing device (e.g., joining computing device 140) being used to join the video conference. For example, participating computing device 110 can receive (e.g., via network(s) 190, video conference applications 120, 180, and/or video conference system 184) a message from hosting computing device 170 indicating joining computing device 140 is joining the video conference.

At 206, computer-implemented method 200 can include compressing, by the first computing device, based at least in part on (e.g., in response to) receipt of the data, the internal encoder state to generate a compressed internal encoder state of the encoder. For example, participating computing device 110 can implement (e.g., via processor(s) 112) compression algorithm 122 in a lossless or near lossless mode and/or in accordance with instructions 118 to compress the existing and/or most current internal encoder state of encoder 126 to generate a compressed internal encoder state of encoder 126.

At 208, computer-implemented method 200 can include transmitting, by the first computing device, the compressed internal encoder state to the second computing device to synchronize (e.g., by joining computing device 140) the internal encoder state of the encoder running on the first computing device with an internal decoder state of a decoder (e.g., decoder 158) running on the second computing device. For example, participating computing device 110 can transmit (e.g., via network(s) 190 and/or video conference applications 120, 150) the compressed internal encoder state to joining computing device 140 to synchronize (e.g., by joining computing device 140) the internal encoder state of encoder 126 running on participating computing device 110 with an internal decoder state of decoder 158 running on joining computing device 140.

Figure 3:
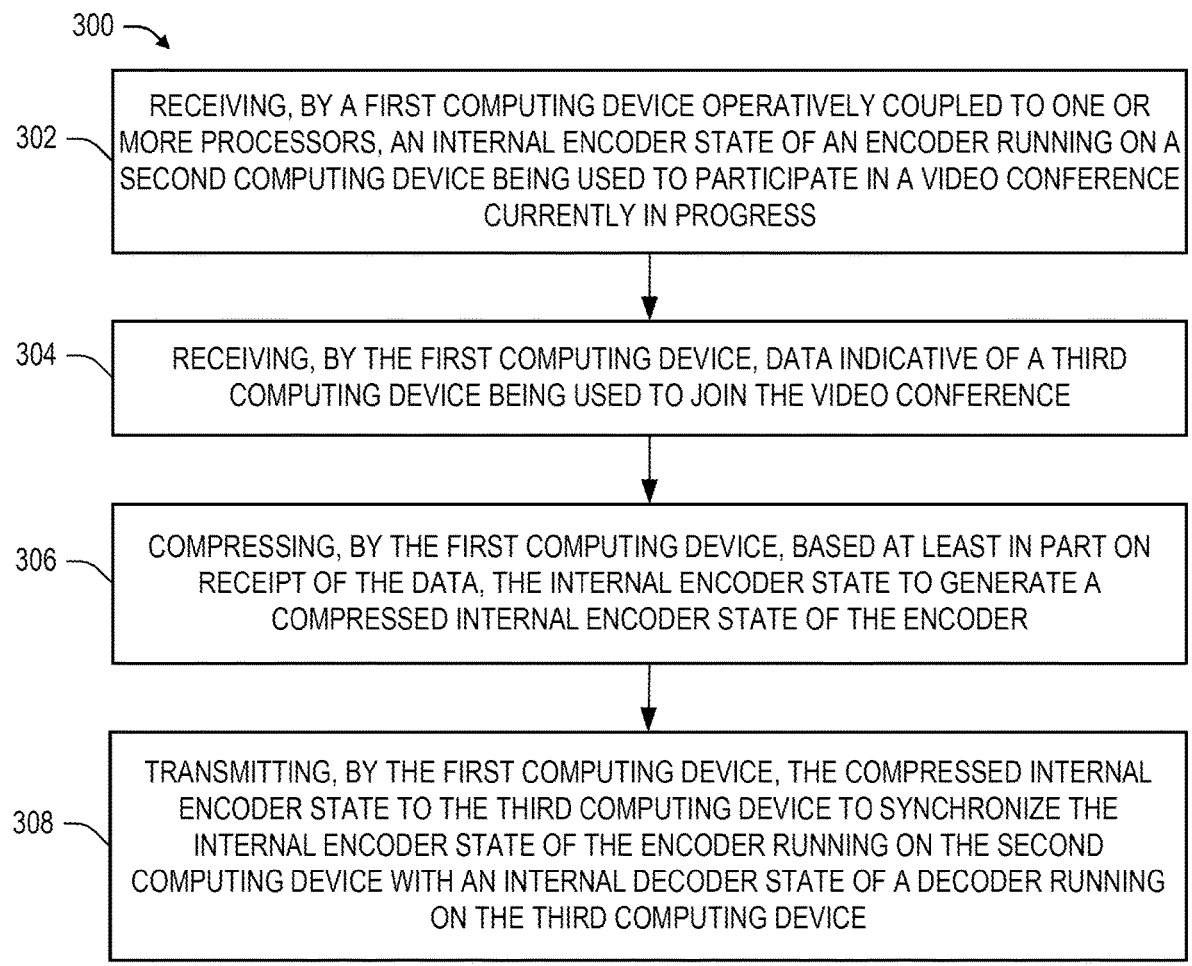

FIG. 3 illustrates a flow diagram of an example, non-limiting computer-implemented method 300 according to one or more example embodiments of the present disclosure. Computer-implemented method 300 can be implemented using, for instance, video conference environment 100, participating computing device 110, joining computing device 140, and/or hosting computing device 170 described above with reference to FIG. 1.

The example embodiment illustrated in FIG. 3 depicts operations performed in a particular order for purposes of illustration and discussion. Those of ordinary skill in the art, using the disclosures provided herein, will understand that various operations or steps of computer-implemented method 300 or any of the other methods disclosed herein may be adapted, modified, rearranged, performed simultaneously, include operations not illustrated, and/or modified in various ways without deviating from the scope of the present disclosure.

At 302, computer-implemented method 300 can include receiving, by a first computing device (e.g., hosting computing device 170) operatively coupled to one or more processors (e.g., processor(s) 172), an internal encoder state of an encoder (e.g., encoder 126) running on a second computing device (e.g., participating computing device 110) being used to participate in a video conference currently in progress. For example, hosting computing device 170 can receive (e.g., via network(s) 190, video conference applications 120, 180, and/or video conference system 184) the internal encoder state (e.g., the existing and/or most current internal encoder state) of encoder 126 running on participating computing device 110.

At 304, computer-implemented method 300 can include receiving, by the first computing device, data indicative of a third computing device (e.g., joining computing device 140) being used to join the video conference. For example, hosting computing device 170 can receive (e.g., via network(s) 190, video conference applications 150, 180, and/or video conference system 184) a request from joining computing device 140 to join the video conference.

At 306, computer-implemented method 300 can include compressing, by the first computing device, based at least in part on receipt of the data, the internal encoder state to generate a compressed internal encoder state of the encoder. For example, hosting computing device 170 can implement (e.g., via processor(s) 172) compression algorithm 182 in a lossless or near lossless mode and/or in accordance with instructions 178 to compress the existing and/or most current internal encoder state of encoder 126 to generate a compressed internal encoder state of encoder 126.

At 308, computer-implemented method 300 can include transmitting, by the first computing device, the compressed internal encoder state to the third computing device to synchronize (e.g., by joining computing device 140) the internal encoder state of the encoder running on the second computing device with an internal decoder state of a decoder (e.g., decoder 158) running on the third computing device. For example, hosting computing device 170 can transmit (e.g., via network(s) 190, video conference applications 150, 180, and/or video conference system 184) the compressed internal encoder state to joining computing device 140 to synchronize (e.g., by joining computing device 140) the internal encoder state of encoder 126 running on participating computing device 110 with an internal decoder state of decoder 158 running on joining computing device 140.

Figure 4:
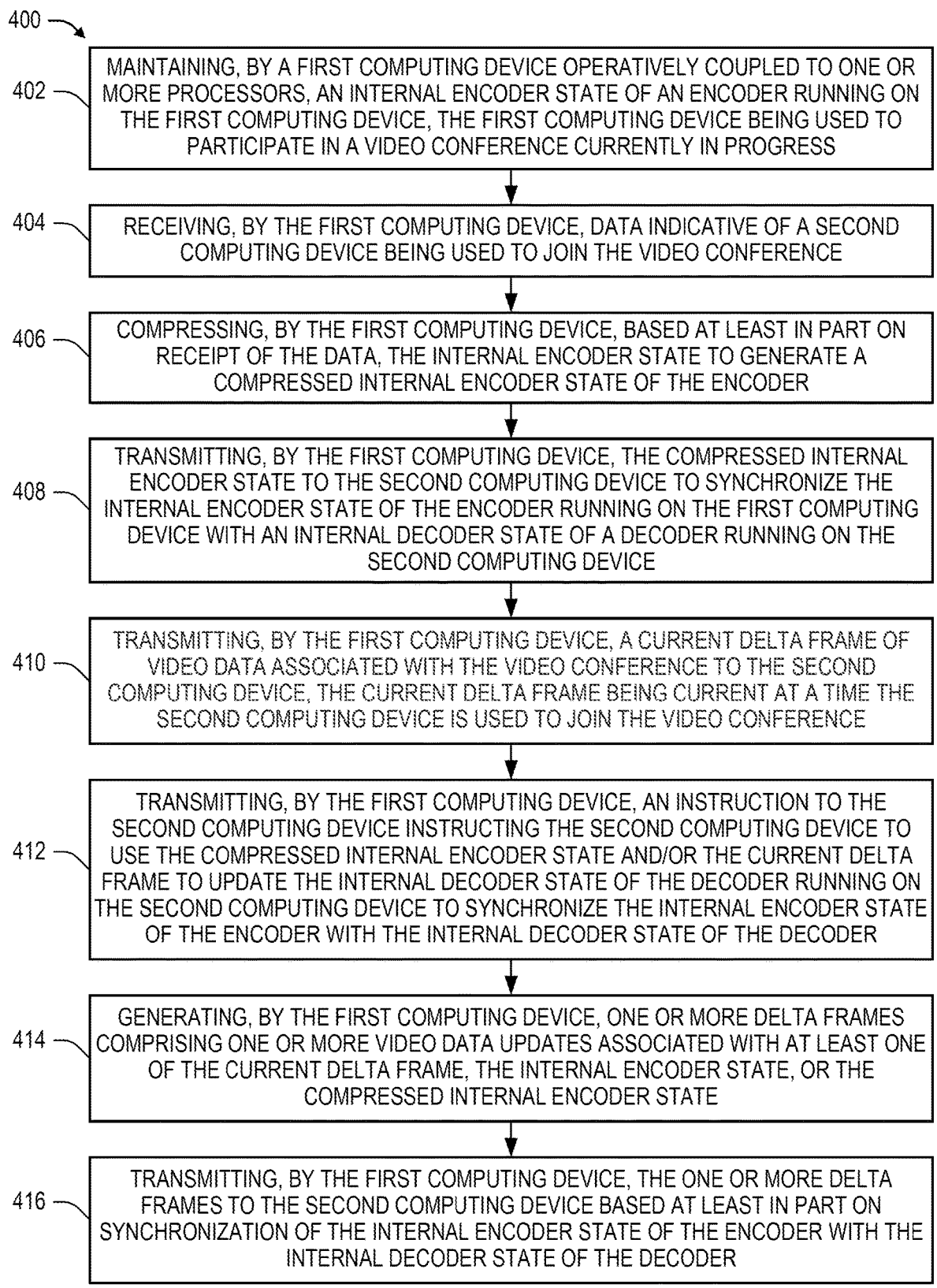

FIG. 4 illustrates a flow diagram of an example, non-limiting computer-implemented method 400 according to one or more example embodiments of the present disclosure. Computer-implemented method 400 can be implemented using, for instance, video conference environment 100, participating computing device 110, joining computing device 140, and/or hosting computing device 170 described above with reference to FIG. 1.

The example embodiment illustrated in FIG. 4 depicts operations performed in a particular order for purposes of illustration and discussion. Those of ordinary skill in the art, using the disclosures provided herein, will understand that various operations or steps of computer-implemented method 400 or any of the other methods disclosed herein may be adapted, modified, rearranged, performed simultaneously, include operations not illustrated, and/or modified in various ways without deviating from the scope of the present disclosure.

At 402, computer-implemented method 400 can include maintaining, by a first computing device (e.g., participating computing device 110) operatively coupled to one or more processors (e.g., processor(s) 112), an internal encoder state of an encoder (e.g., encoder 126) running on the first computing device, the first computing device being used to participate in a video conference currently in progress. For example, participating computing device 110 can periodically and/or continuously (e.g., as needed) update an existing and/or most current internal encoder state of encoder 126 using, for instance, delta frames having current video data associated with a video stream of the video conference that can be generated by and/or provided to (e.g., as needed) participating computing device 110 during the video conference.

At 404, computer-implemented method 400 can include receiving, by the first computing device, data indicative of a second computing device (e.g., joining computing device 140) being used to join the video conference. For example, participating computing device 110 can receive (e.g., via network(s) 190, video conference applications 120, 180, and/or video conference system 184) a message from hosting computing device 170 indicating joining computing device 140 is joining the video conference.

At 406, computer-implemented method 400 can include compressing, by the first computing device, based at least in part on (e.g., in response to) receipt of the data, the internal encoder state to generate a compressed internal encoder state of the encoder. For example, participating computing device 110 can implement (e.g., via processor(s) 112) compression algorithm 122 in a lossless or near lossless mode and/or in accordance with instructions 118 to compress the existing and/or most current internal encoder state of encoder 126 to generate a compressed internal encoder state of encoder 126.

At 408, computer-implemented method 400 can include transmitting, by the first computing device, the compressed internal encoder state to the second computing device to synchronize (e.g., by joining computing device 140) the internal encoder state of the encoder running on the first computing device with an internal decoder state of a decoder (e.g., decoder 158) running on the second computing device. For example, participating computing device 110 can transmit (e.g., via network(s) 190 and/or video conference applications 120, 150) the compressed internal encoder state to joining computing device 140 to synchronize (e.g., by joining computing device 140) the internal encoder state of encoder 126 running on participating computing device 110 with an internal decoder state of decoder 158 running on joining computing device 140.

At 410, computer-implemented method 400 can include transmitting, by the first computing device, a current delta frame of video data associated with the video conference to the second computing device, the current delta frame being current at a time the second computing device is used to join the video conference. For example, participating computing device 110 can send (e.g., via network(s) 190 and/or video conference applications 120, 150) joining computing device 140 a delta frame of the video of the video conference that is the most current delta frame at the time joining computing device 140 requests entry into the video conference and/or at the time joining computing device 140 joins the video conference.

At 412, computer-implemented method 400 can include transmitting, by the first computing device, an instruction to the second computing device instructing the second computing device to use the compressed internal encoder state and/or the current delta frame to update the internal decoder state of the decoder running on the second computing device to synchronize the internal encoder state of the encoder with the internal decoder state of the decoder. For example, participating computing device 110 can instruct (e.g., via network(s) 190 and/or video conference applications 120, 150) joining computing device 140 to store the compressed internal encoder state and/or the current delta frame of the video data in the memory (e.g., RAM) of decoder 158 running on joining computing device 140 such that the compressed internal encoder state and/or the current delta frame constitute and/or serve as the internal decoder state of decoder 158.

At 414, computer-implemented method 400 can include generating, by the first computing device, one or more delta frames comprising one or more video data updates associated with at least one of the current delta frame, the internal encoder state, or the compressed internal encoder state. For example, after synchronization of the internal states of encoder 126 and decoder 158 as described above, participating computing device 110 can generate such delta frame(s) by computing and/or determining the difference in video data of current video frames in the video stream of the video conference compared to existing reference frames of the internal encoder state of encoder 126. For instance, participating computing device 110 can generate delta frame(s) having video data including portion(s) of video frame(s) and/or statistical data corresponding thereto that is different from and/or more current (e.g., newer) compared to the video data included in the compressed internal encoder state of encoder 126 and/or the previously provided current delta frame described above.

At 416, computer-implemented method 400 can include transmitting, by the first computing device, the one or more delta frames to the second computing device based at least in part on synchronization of the internal encoder state of the encoder with the internal decoder state of the decoder. For example, after synchronization of the internal states of encoder 126 and decoder 158 as described above, participating computing device 110 can periodically and/or continuously (e.g., as needed) generate and transmit (e.g., via network(s) 190 and/or video conference applications 120, 150) the above-described delta frame(s) to joining computing device 140 so that joining computing device 140 can use such delta frame(s) to update the internal decoder state of decoder 158 and thereby maintain synchronization of the internal decoder state of decoder 158 with the internal encoder state of encoder 126.

Figure 5:
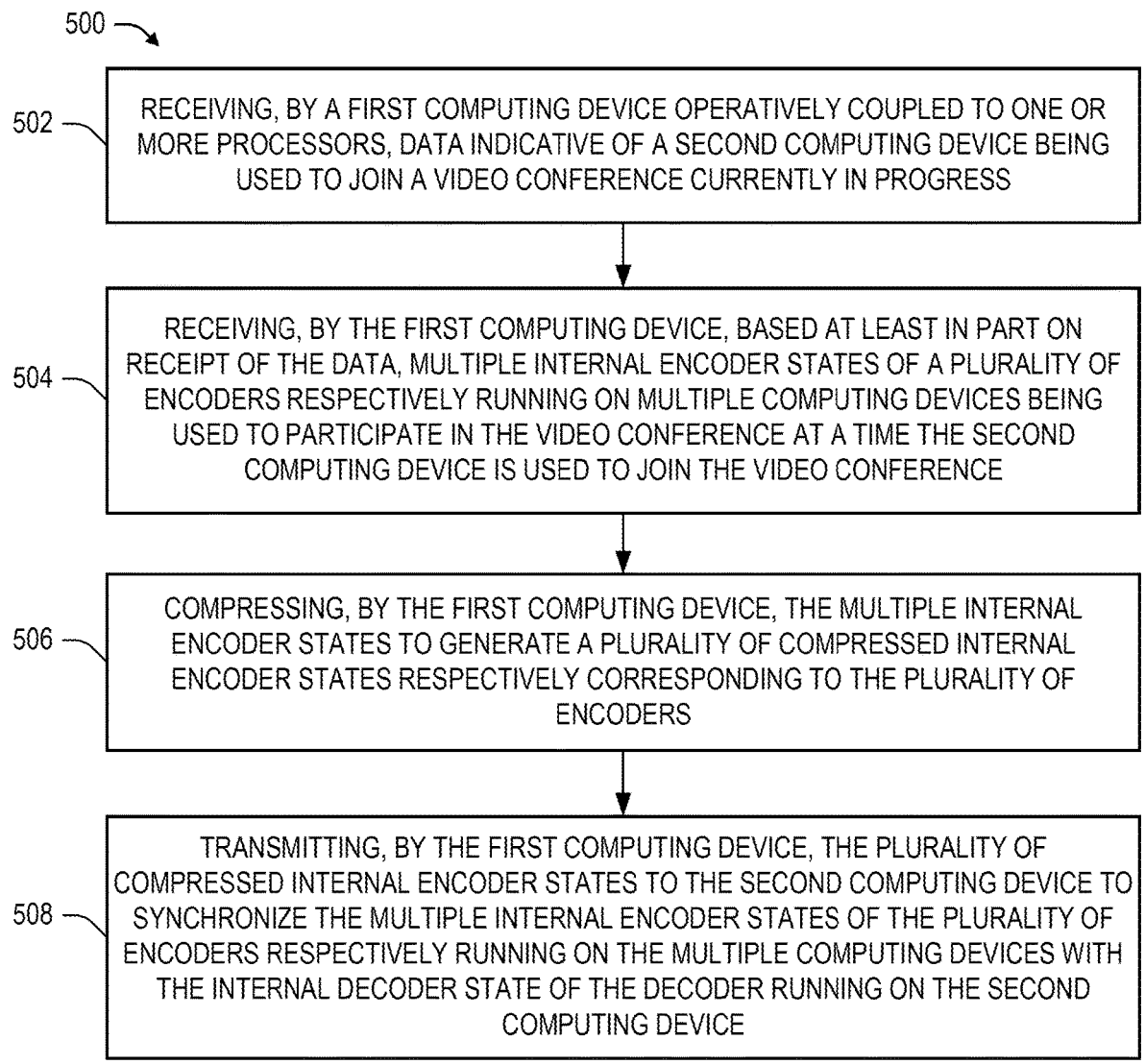

FIG. 5 illustrates a flow diagram of an example, non-limiting computer-implemented method 500 according to one or more example embodiments of the present disclosure. Computer-implemented method 400 can be implemented using, for instance, video conference environment 100, participating computing device 110, joining computing device 140, and/or hosting computing device 170 described above with reference to FIG. 1.

The example embodiment illustrated in FIG. 5 depicts operations performed in a particular order for purposes of illustration and discussion. Those of ordinary skill in the art, using the disclosures provided herein, will understand that various operations or steps of computer-implemented method 500 or any of the other methods disclosed herein may be adapted, modified, rearranged, performed simultaneously, include operations not illustrated, and/or modified in various ways without deviating from the scope of the present disclosure.

At 502, computer-implemented method 500 can include receiving, by a first computing device (e.g., hosting computing device 170) operatively coupled to one or more processors (e.g., processor(s) 172), data indicative of a second computing device being used to join a video conference currently in progress. For example, hosting computing device 170 can receive (e.g., via network(s) 190, video conference applications 120, 180, and/or video conference system 184) a request from joining computing device 140 to join the video conference.

At 504, computer-implemented method 500 can include receiving, by the first computing device, based at least in part on receipt of the data, multiple internal encoder states of a plurality of encoders (e.g., a plurality of encoders 126) respectively running on multiple computing devices (e.g., participating computing devices 102, 104, 106, 110) being used to participate in the video conference at a time the second computing device is used to join the video conference. For example, hosting computing device 170 can receive (e.g., via network(s) 190, video conference applications 120, 180, and/or video conference system 184) the existing and/or most current internal encoder state of each encoder 126 respectively running on participating computing devices 102, 104, 106, 110.

At 506, computer-implemented method 500 can include compressing, by the first computing device, the multiple internal encoder states to generate a plurality of compressed internal encoder states respectively corresponding to the plurality of encoders. For example, hosting computing device 170 can implement (e.g., via processor(s) 172) compression algorithm 182 in a lossless or near lossless mode and/or in accordance with instructions 178 to compress the existing and/or most current internal encoder state of each encoder 126 respectively running on participating computing devices 102, 104, 106, 110 to generate a compressed internal encoder state corresponding to each encoder 126 respectively running on participating computing devices 102, 104, 106, 110.

At 508, computer-implemented method 500 can include transmitting, by the first computing device, the plurality of compressed internal encoder states to the second computing device to synchronize (e.g., by joining computing device 140) the multiple internal encoder states of the plurality of encoders respectively running on the multiple computing devices with an internal decoder state of decoder (e.g., decoder 158) running on the second computing device. For example, hosting computing device 170 can transmit (e.g., via network(s) 190, video conference applications 150, 180, and/or video conference system 184) the plurality of compressed internal encoder states to joining computing device 140 to synchronize (e.g., by joining computing device 140) the internal encoder state of each encoder 126 respectively running on participating computing devices 102, 104, 106, 110 with an internal decoder state of decoder 158 running on joining computing device 140.

Figure 6:
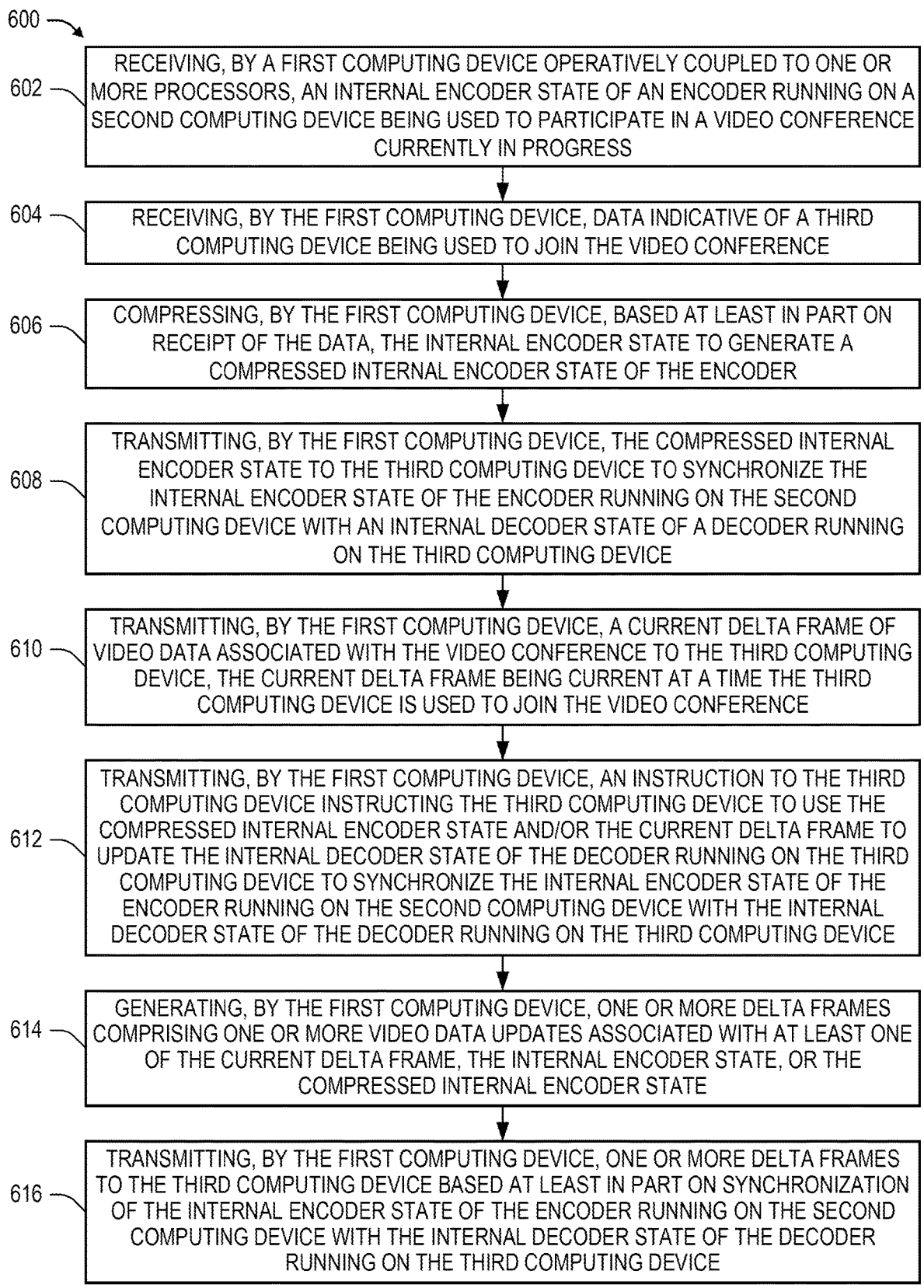

FIG. 6 illustrates a flow diagram of an example, non-limiting computer-implemented method 600 according to one or more example embodiments of the present disclosure. Computer-implemented method 600 can be implemented using, for instance, video conference environment 100, participating computing device 110, joining computing device 140, and/or hosting computing device 170 described above with reference to FIG. 1.

The example embodiment illustrated in FIG. 6 depicts operations performed in a particular order for purposes of illustration and discussion. Those of ordinary skill in the art, using the disclosures provided herein, will understand that various operations or steps of computer-implemented method 600 or any of the other methods disclosed herein may be adapted, modified, rearranged, performed simultaneously, include operations not illustrated, and/or modified in various ways without deviating from the scope of the present disclosure.

At 602, computer-implemented method 600 can include receiving, by a first computing device (e.g., hosting computing device 170) operatively coupled to one or more processors (e.g., processor(s) 172), an internal encoder state of an encoder (e.g., encoder 126) running on a second computing device (e.g., participating computing device 110) being used to participate in a video conference currently in progress. For example, hosting computing device 170 can receive (e.g., via network(s) 190, video conference applications 120, 180, and/or video conference system 184) the internal encoder state (e.g., the existing and/or most current internal encoder state) of encoder 126 running on participating computing device 110.

At 604, computer-implemented method 600 can include receiving, by the first computing device, data indicative of a third computing device (e.g., joining computing device 140) being used to join the video conference. For example, hosting computing device 170 can receive (e.g., via network(s) 190, video conference applications 150, 180, and/or video conference system 184) a request from joining computing device 140 to join the video conference.

At 606, computer-implemented method 600 can include compressing, by the first computing device, based at least in part on receipt of the data, the internal encoder state to generate a compressed internal encoder state of the encoder. For example, hosting computing device 170 can implement (e.g., via processor(s) 172) compression algorithm 182 in a lossless or near lossless mode and/or in accordance with instructions 178 to compress the existing and/or most current internal encoder state of encoder 126 to generate a compressed internal encoder state of encoder 126.

At 608, computer-implemented method 600 can include transmitting, by the first computing device, the compressed internal encoder state to the third computing device to synchronize (e.g., by joining computing device 140) the internal encoder state of the encoder running on the second computing device with an internal decoder state of a decoder (e.g., decoder 158) running on the third computing device. For example, hosting computing device 170 can transmit (e.g., via network(s) 190, video conference applications 150, 180, and/or video conference system 184) the compressed internal encoder state to joining computing device 140 to synchronize (e.g., by joining computing device 140) the internal encoder state of encoder 126 running on participating computing device 110 with an internal decoder state of decoder 158 running on joining computing device 140.

At 610, computer-implemented method 600 can include transmitting, by the first computing device, a current delta frame of video data associated with the video conference to the third computing device, the current delta frame being current at a time the third computing device is used to join the video conference. For example, hosting computing device 170 can send (e.g., via network(s) 190, video conference applications 150, 180, and/or video conference system 184) joining computing device 140 a delta frame of the video of the video conference that is the most current delta frame at the time joining computing device 140 requests entry into the video conference and/or at the time joining computing device 140 joins the video conference.

At 612, computer-implemented method 600 can include transmitting, by the first computing device, an instruction to the third computing device instructing the third computing device to use the compressed internal encoder state and/or the current delta frame to update the internal decoder state of the decoder running on the third computing device to synchronize the internal encoder state of the encoder running on the second computing device with the internal decoder state of the decoder running on the third computing device. For example, hosting computing device 170 can instruct (e.g., via network(s) 190, video conference applications 150, 180, and/or video conference system 184) joining computing device 140 to store the compressed internal encoder state and/or the current delta frame of the video data in the memory (e.g., RAM) of decoder 158 running on joining computing device 140 such that the compressed internal encoder state and/or the current delta frame constitute and/or serve as the internal decoder state of decoder 158.

At 614, computer-implemented method 600 can include generating, by the first computing device, one or more delta frames comprising one or more video data updates associated with at least one of the current delta frame, the internal encoder state, or the compressed internal encoder state. For example, after synchronization of the internal states of encoder 126 and decoder 158 as described above, hosting computing device 170 can generate such delta frame(s) by computing and/or determining the difference in video data of current video frames in the video stream of the video conference compared to existing reference frames of the internal encoder state of encoder 126. For instance, hosting computing device 170 can generate delta frame(s) having video data including portion(s) of video frame(s) and/or statistical data corresponding thereto that is different from and/or more current (e.g., newer) compared to the video data included in the compressed internal encoder state of encoder 126 and/or the previously provided current delta frame described above.

At 616, computer-implemented method 600 can include transmitting, by the first computing device, one or more delta frames to the third computing device based at least in part on synchronization of the internal encoder state of the encoder running on the second computing device with the internal decoder state of the decoder running on the third computing device. For example, after synchronization of the internal states of encoder 126 and decoder 158 as described above, hosting computing device 170 can periodically and/or continuously (e.g., as needed) generate and transmit (e.g., via network(s) 190, video conference applications 150, 180, and/or video conference system 184) the above-described delta frame(s) to joining computing device 140 so that joining computing device 140 can use such delta frame(s) to update the internal decoder state of decoder 158 and thereby maintain synchronization of the internal decoder state of decoder 158 with the internal encoder state of encoder 126.

Figure 7:
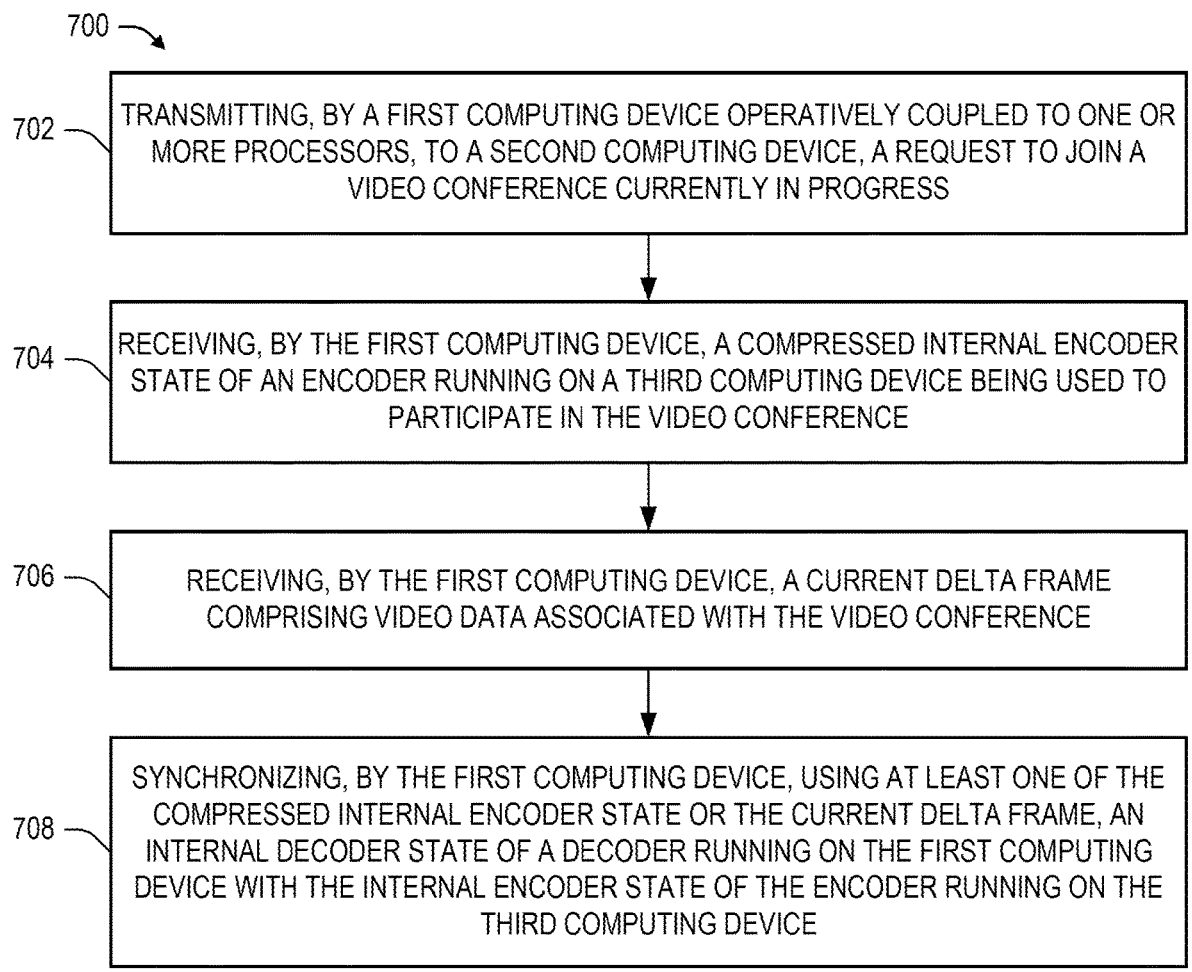

FIG. 7 illustrates a flow diagram of an example, non-limiting computer-implemented method 700 according to one or more example embodiments of the present disclosure. Computer-implemented method 700 can be implemented using, for instance, video conference environment 100, participating computing device 110, joining computing device 140, and/or hosting computing device 170 described above with reference to FIG. 1.

The example embodiment illustrated in FIG. 7 depicts operations performed in a particular order for purposes of illustration and discussion. Those of ordinary skill in the art, using the disclosures provided herein, will understand that various operations or steps of computer-implemented method 700 or any of the other methods disclosed herein may be adapted, modified, rearranged, performed simultaneously, include operations not illustrated, and/or modified in various ways without deviating from the scope of the present disclosure.

At 702, computer-implemented method 700 can include transmitting, by a first computing device (e.g., joining computing device 140) operatively coupled to one or more processors (e.g., processor(s) 142), to a second computing device (e.g., hosting computing device 170), a request to join a video conference currently in progress. For example, joining computing device 140 can transmit (e.g., via network(s) 190, video conference applications 150, 180, and/or video conference system 184) a message to hosting computing device 170 requesting to join the video conference.

At 704, computer-implemented method 700 can include receiving, by the first computing device, a compressed internal encoder state of an encoder (e.g., encoder 126) running on a third computing device (e.g., participating computing device 110) being used to participate in the video conference. For example, based at least in part on (e.g., in response to) submittal of the request to join the video conference as described above, joining computing device 140 can receive from hosting computing device 170 (e.g., via network(s) 190, video conference applications 150, 180, and/or video conference system 184) a compressed version of an existing and/or most current internal encoder state of encoder 126 running on participating computing device 110.

At 706, computer-implemented method 700 can include receiving, by the first computing device, a current delta frame comprising video data associated with the video conference. For example, joining computing device 140 can receive (e.g., via network(s) 190, video conference applications 150, 180, and/or video conference system 184) a delta frame of the video of the video conference that is the most current delta frame at the time joining computing device 140 requests entry into the video conference and/or at the time joining computing device 140 joins the video conference.

In some embodiments, computer-implemented method 700 can further include receiving, by the first computing device, an instruction to use the compressed internal encoder state and/or the current delta frame to update an internal decoder state of a decoder (e.g., decoder 158) running on the first computing device to synchronize the internal encoder state of the encoder with the internal decoder state of the decoder. For example, joining computing device 140 can receive (e.g., via network(s) 190, video conference applications 150, 180, and/or video conference system 184) an instruction to store the compressed internal encoder state and/or the current delta frame of the video data in the memory (e.g., RAM) of decoder 158 running on joining computing device 140 such that the compressed internal encoder state and/or the current delta frame constitute and/or serve as the internal decoder state of decoder 158.

At 708, computer-implemented method 700 can include synchronizing, by the first computing device, using at least one of the compressed internal encoder state or the current delta frame, an internal decoder state of a decoder (e.g., decoder 158) running on the first computing device with the internal encoder state of the encoder running on the third computing device. For example, joining computing device 140 can store the compressed internal encoder state and/or the current delta frame of the video data in the memory (e.g., RAM) of decoder 158 running on joining computing device 140 such that the compressed internal encoder state and/or the current delta frame constitute and/or serve as the internal decoder state of decoder 158. In this example, once joining computing device 140 has stored the compressed internal encoder state and/or the current delta frame in the memory of decoder 158 such that the compressed internal encoder state and/or the current delta frame constitute and/or serve as the internal decoder state of decoder 158, the internal encoder state of encoder 126 running on participating computing device 110 will be synchronized with the internal decoder state of decoder 158 running on joining computing device 140.

Additional Disclosure

The technology discussed herein makes reference to servers, databases, software applications, and other computer-based systems, as well as actions performed by, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method of transferring an internal codec state in a video conference system, the computer-implemented method comprising:
    maintaining, by a first computing device operatively coupled to one or more processors, an internal encoder state of an encoder running on the first computing device, the first computing device being used to participate in a video conference currently in progress;
    receiving, by the first computing device, data indicative of a second computing device being used to join the video conference;
    compressing, by the first computing device, based at least in part on receipt of the data, the internal encoder state to generate a compressed internal encoder state of the encoder;
    transmitting, by the first computing device, the compressed internal encoder state to the second computing device to synchronize the internal encoder state of the encoder running on the first computing device with an internal decoder state of a decoder running on the second computing device; and
    transmitting, by the first computing device to the second computing device, an instruction instructing the second computing device to synchronize the internal encoder state of the encoder with the internal decoder state of the decoder by updating the internal decoder state of the decoder based on the compressed internal encoder state.

2. The computer-implemented method of claim 1, wherein the internal encoder state comprises at least one of: one or more portions of one or more reference frames of video data associated with the video conference; or statistical data corresponding to at least one of the one or more portions of the one or more reference frames or the one or more reference frames.

3. The computer-implemented method of claim 1, wherein the compressed internal encoder state comprises at least one of: one or more compressed portions of one or more reference frames of video data associated with the video conference; or compressed statistical data corresponding to at least one of the one or more compressed portions of the one or more reference frames or the one or more reference frames.

4. The computer-implemented method of claim 1, further comprising:
    transmitting, by the first computing device, a current delta frame of video data associated with the video conference to the second computing device, the current delta frame being current at a time the second computing device is used to join the video conference.

5. The computer-implemented method of claim 1, further comprising:
    generating, by the first computing device, one or more delta frames comprising one or more video data updates associated with at least one of the internal encoder state or the compressed internal encoder state.

6. The computer-implemented method of claim 1, further comprising:
    transmitting, by the first computing device, one or more delta frames to the second computing device based at least in part on synchronization of the internal encoder state of the encoder with the internal decoder state of the decoder, the one or more delta frames comprising one or more video data updates associated with at least one of the internal encoder state or the compressed internal encoder state.

7. The computer-implemented method of claim 1, wherein compressing, by the first computing device, based at least in part on receipt of the data, the internal encoder state to generate the compressed internal encoder state of the encoder comprises:
compressing, by the first computing device, based at least in part on receipt of the data, the internal encoder state to generate the compressed internal encoder state of the encoder using a compression algorithm having at least one of a lossless compression mode or a near lossless compression mode.

8. The computer-implemented method of claim 7, wherein compressing, by the first computing device, based at least in part on receipt of the data, the internal encoder state to generate the compressed internal encoder state of the encoder using the compression algorithm having at least one of the lossless compression mode or the near lossless compression mode comprises:
compressing, by the first computing device, based at least in part on receipt of the data, the internal encoder state to generate the compressed internal encoder state of the encoder using the compression algorithm set in the lossless compression mode or the near lossless compression mode such that compression of the internal encoder state comprises a lossless compression or a near lossless compression of the internal encoder state.

9. A computer-implemented method of transferring an internal codec state in a video conference system, the computer-implemented method comprising:
receiving, by a first computing device operatively coupled to one or more processors, an internal encoder state of an encoder running on a second computing device being used to participate in a video conference currently in progress;
receiving, by the first computing device, data indicative of a third computing device being used to join the video conference;
compressing, by the first computing device, based at least in part on receipt of the data, the internal encoder state to generate a compressed internal encoder state of the encoder;
transmitting, by the first computing device, the compressed internal encoder state to the third computing device to synchronize the internal encoder state of the encoder running on the second computing device with an internal decoder state of a decoder running on the third computing device; and
transmitting, by the first computing device, an instruction to the third computing device instructing the third computing device to use the compressed internal encoder state to update the internal decoder state of the decoder running on the third computing device to synchronize the internal encoder state of the encoder running on the second computing device with the internal decoder state of the decoder running on the third computing device.

10. The computer-implemented method of claim 9, further comprising:
receiving, by the first computing device, based at least in part on receipt of the data, multiple internal encoder states of a plurality of encoders respectively running on multiple computing devices being used to participate in the video conference at a time the third computing device is used to join the video conference;
compressing, by the first computing device, the multiple internal encoder states to generate a plurality of compressed internal encoder states respectively corresponding to the plurality of encoders; and
transmitting, by the first computing device, the plurality of compressed internal encoder states to the third computing device to synchronize the multiple internal encoder states of the plurality of encoders respectively running on the multiple computing devices with the internal decoder state of the decoder running on the third computing device.

11. The computer-implemented method of claim 9, wherein the internal encoder state comprises at least one of: one or more portions of one or more reference frames of video data associated with the video conference; or statistical data corresponding to at least one of the one or more portions of the one or more reference frames or the one or more reference frames.

12. The computer-implemented method of claim 9, wherein the compressed internal encoder state comprises at least one of: one or more compressed portions of one or more reference frames of video data associated with the video conference; or compressed statistical data corresponding to at least one of the one or more compressed portions of the one or more reference frames or the one or more reference frames.

13. The computer-implemented method of claim 9, further comprising:
transmitting, by the first computing device, a current delta frame of video data associated with the video conference to the third computing device, the current delta frame being current at a time the third computing device is used to join the video conference.

14. The computer-implemented method of claim 9, further comprising:
generating, by the first computing device, one or more delta frames comprising one or more video data updates associated with at least one of the internal encoder state or the compressed internal encoder state.

15. The computer-implemented method of claim 9, further comprising:
transmitting, by the first computing device, one or more delta frames to the third computing device based at least in part on synchronization of the internal encoder state of the encoder running on the second computing device with the internal decoder state of the decoder running on the third computing device, the one or more delta frames comprising one or more video data updates associated with at least one of the internal encoder state or the compressed internal encoder state.

16. The computer-implemented method of claim 9, wherein compressing, by the first computing device, based at least in part on receipt of the data, the internal encoder state to generate the compressed internal encoder state of the encoder comprises:
compressing, by the first computing device, based at least in part on receipt of the data, the internal encoder state to generate the compressed internal encoder state of the encoder using a compression algorithm having at least one of a lossless compression mode or a near lossless compression mode.

17. The computer-implemented method of claim 16, wherein compressing, by the first computing device, based at least in part on receipt of the data, the internal encoder state to generate the compressed internal encoder state of the encoder using the compression algorithm having at least one of the lossless compression mode or the near lossless compression mode comprises:

compressing, by the first computing device, based at least in part on receipt of the data, the internal encoder state to generate the compressed internal encoder state of the encoder using the compression algorithm set in the lossless compression mode or the near lossless compression mode such that compression of the internal encoder state comprises a lossless compression or a near lossless compression of the internal encoder state.

18. A computing system, comprising:

one or more processors; and one or more non-transitory computer-readable media that store instructions that, when executed by the one or more processors, cause the computing system to perform operations, the operations comprising:

receiving an internal encoder state of an encoder running on a first computing device being used to participate in a video conference currently in progress;

receiving data indicative of a second computing device being used to join the video conference;

compressing, based at least in part on receipt of the data, the internal encoder state to generate a compressed internal encoder state of the encoder;

transmitting the compressed internal encoder state to the second computing device to synchronize the internal encoder state of the encoder running on the first computing device with an internal decoder state of a decoder running on the second computing device; and transmitting, to the second computing device, an instruction instructing the second computing device to synchronize the internal encoder state of the encoder with the internal decoder state of the decoder by updating the internal decoder state of the decoder based on the compressed internal encoder state.

\* \* \* \* \*